United States Patent
Adessa

(10) Patent No.: US 8,364,999 B1
(45) Date of Patent: Jan. 29, 2013

(54) SYSTEM AND METHOD FOR PROCESSOR WORKLOAD METERING

(75) Inventor: Frank A. Adessa, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 254 days.

(21) Appl. No.: 12/821,860

(22) Filed: Jun. 23, 2010

(51) Int. Cl.
*G06F 1/00* (2006.01)

(52) U.S. Cl. .................................................. 713/323

(58) Field of Classification Search .................. 713/300
See application file for complete search history.

(56) References Cited

U.S. PATENT DOCUMENTS

| | | | |
|---|---|---|---|
| 6,952,217 B1 * | 10/2005 | Diard et al. | 345/562 |
| 6,996,728 B2 * | 2/2006 | Singh | 713/300 |
| 7,015,915 B1 * | 3/2006 | Diard | 345/522 |
| 7,051,221 B2 * | 5/2006 | Clabes et al. | 713/320 |
| 7,330,988 B2 * | 2/2008 | Golla et al. | 713/322 |
| 7,373,269 B2 * | 5/2008 | Furuichi et al. | 702/132 |
| 7,525,548 B2 * | 4/2009 | Azar et al. | 345/504 |
| 7,552,346 B2 * | 6/2009 | Aguilar et al. | 713/300 |
| 7,629,978 B1 * | 12/2009 | Diard | 345/502 |
| 7,702,779 B1 * | 4/2010 | Gupta et al. | 709/224 |
| 7,756,666 B2 * | 7/2010 | Aguilar et al. | 702/130 |
| 7,761,874 B2 * | 7/2010 | Bodas | 718/100 |
| 7,793,150 B1 * | 9/2010 | Boucher | 714/16 |
| 7,949,888 B2 * | 5/2011 | Cox et al. | 713/323 |
| 7,949,889 B2 * | 5/2011 | Sotomayor et al. | 713/323 |
| 7,954,101 B2 * | 5/2011 | Adachi et al. | 718/102 |
| 8,015,423 B1 * | 9/2011 | Satterfield et al. | 713/322 |
| 8,150,561 B2 * | 4/2012 | Shimotono et al. | 700/300 |
| 8,228,337 B1 * | 7/2012 | Khodakovsky et al. | 345/502 |
| 8,234,488 B1 * | 7/2012 | Riach et al. | 713/100 |
| 8,248,412 B2 * | 8/2012 | Fowler et al. | 345/421 |
| 2004/0064745 A1 * | 4/2004 | Kadambi | 713/322 |
| 2004/0263519 A1 * | 12/2004 | Andrews et al. | 345/502 |
| 2006/0020831 A1 * | 1/2006 | Golla et al. | 713/300 |
| 2006/0129852 A1 * | 6/2006 | Bonola et al. | 713/300 |
| 2007/0016815 A1 * | 1/2007 | Cooper et al. | 713/322 |
| 2007/0103590 A1 * | 5/2007 | Azar et al. | 348/459 |
| 2007/0266391 A1 * | 11/2007 | Hoffman et al. | 718/106 |
| 2009/0089792 A1 * | 4/2009 | Johnson et al. | 718/105 |
| 2009/0177422 A1 * | 7/2009 | Cox et al. | 702/64 |
| 2009/0177907 A1 * | 7/2009 | Sotomayor et al. | 713/340 |
| 2010/0066747 A1 * | 3/2010 | Diard | 345/502 |
| 2010/0191993 A1 * | 7/2010 | Chaudhry et al. | 713/322 |
| 2010/0332876 A1 * | 12/2010 | Fields et al. | 713/323 |

* cited by examiner

*Primary Examiner* — Ryan Stiglic
(74) *Attorney, Agent, or Firm* — Patterson & Sheridan, LLP

(57) ABSTRACT

One embodiment of the present invention sets forth a technique for metering a processing workload. A freeze time and run time are used to control whether or not pointers to command buffers are popped from a FIFO and the commands that generate a workload are read for processing. Smaller bursts of commands broken up by periods of idleness are coalesced by the workload metering to create larger bursts of commands during the run time and longer periods of idleness during the freeze time. Power saving features may be enabled during the periods of idleness to reduce the power consumption of the device performing the processing.

17 Claims, 7 Drawing Sheets

SYSTEM AND METHOD FOR PROCESSOR WORKLOAD METERING

BACKGROUND OF THE INVENTION

1. Field of the Invention

The present invention generally relates to processing and more specifically to metering a processing workload to control power consumption and/or thermal characteristics.

2. Description of the Related Art

Conventional processors enter a low power mode when the processor becomes idle due to a lack of processing workload. Typically, the lack of processing workload is detected and confirmed over several clock cycles before the low power mode is initiated. There is a latency associated with entering and exiting the low power mode, so confirmation is used to ensure that the low power mode is entered when the processor is likely to remain in a low power mode for a time that is greater than the entering and exiting latency.

Accordingly, what is needed in the art is a system and method for improved techniques for reducing power consumption based on the processing workload.

SUMMARY OF THE INVENTION

A system and method for metering a processing workload. A command stream that is input to a processor is metered to coalesce multiple smaller workloads into one or more larger workloads with longer periods of idleness between the larger workloads. The processor may be idled during the longer periods of idleness and power consumption may be reduced by initiating power saving features of the processor. Conversely, a large workload may be metered to break the large workload into smaller bursts to ensure that the processor operates below a maximum temperature limit.

Various embodiments of a method of the invention for metering a processing workload include receiving a processing workload at a processor and determining that the processing workload will be metered to produce a metered processing workload. A freeze time during which a command stream defining the metered processing workload is not fetched and is not executed by the processor is initiated and a run time during which the command stream defining the metered processing workload is fetched and executed by the processor is initiated.

Various embodiments of the invention include a system for metering a processing workload. The system includes a processor that is configured to receive a processing workload and determining that the processing workload will be metered to produce a metered processing workload. A freeze time during which a command stream defining the metered processing workload is not fetched and is not executed by the processor is initiated and a run time during which the command stream defining the metered processing workload is fetched and executed by the processor is initiated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
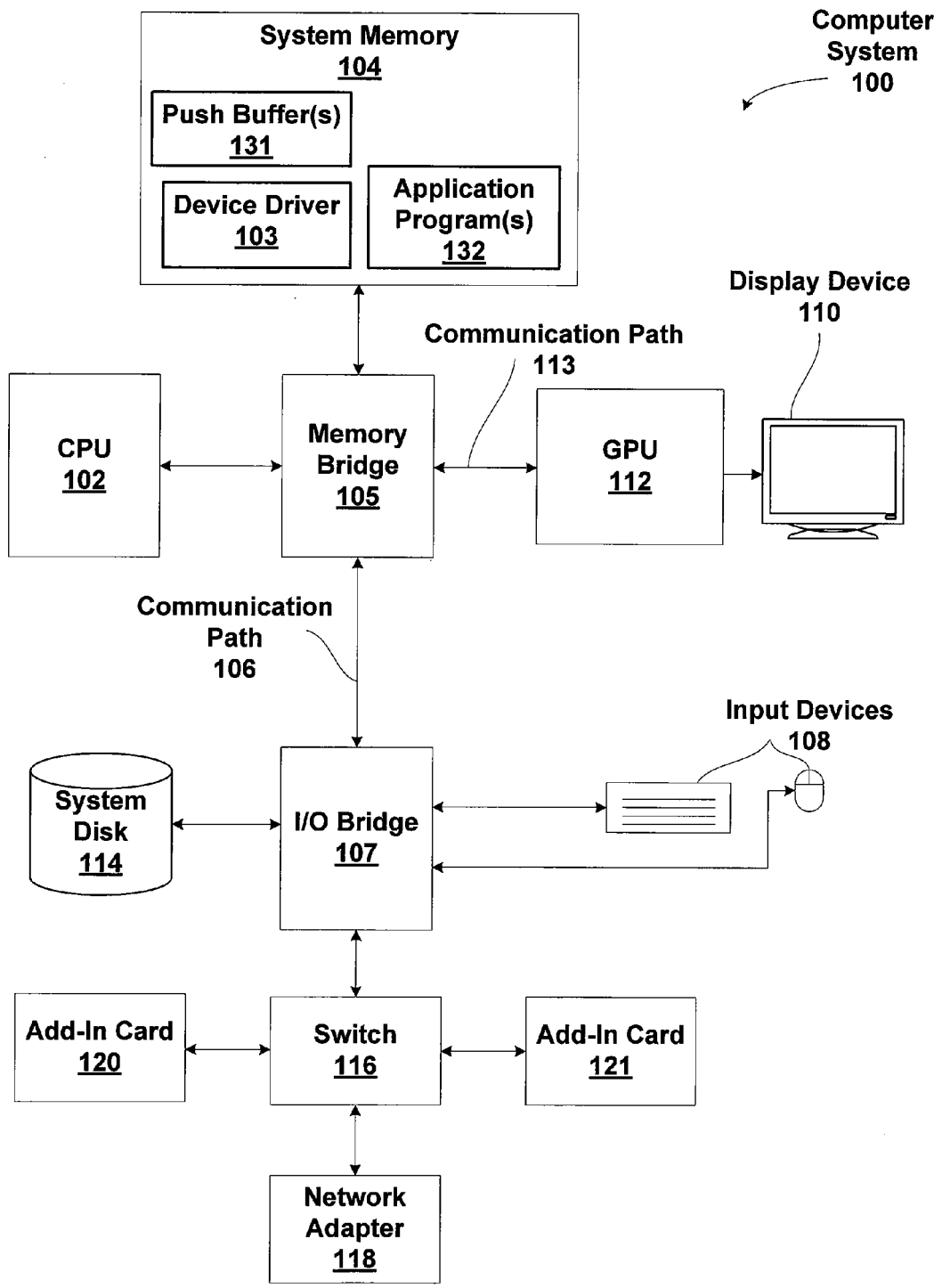
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A graphics processing unit (GPU) 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the GPU 112 incorporates circuitry optimized for two and three-dimensional graphics and video processing. In another embodiment, the GPU 112 incorporates circuitry optimized for general purpose processing, while preserving the underlying computational architecture, described in greater detail herein. In yet another embodiment, the GPU 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of GPUs 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more GPUs 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The GPU 112 may include rendering pipelines that can be configured to perform various tasks related to generating pixel data from graphics data supplied by CPU 102 and/or system memory 104 via memory bridge 105 and bus 113, interacting with local parallel processing memory (see memory 204 of FIG. 2 which can be used as graphics memory including, e.g., a conventional frame buffer) to store and update pixel data, delivering pixel data to display device 110, and the like. The GPU 112 may be configured to support power-saving features such as engine level power gating (ELPG) that disables the clock provided to individual processing engines within the GPU 112. The GPU 112 may also be configured to consume less power by reducing the clock rate supplied to the GPU 112 or processing engines within the GPU 112. Processing workload metering may be used in conjunction with any existing power-saving features since the workload metering controls the amount of work that is received for processing by the processing engines within the GPU 112, as described further herein. A device driver 103 is configured to interface between the CPU 102 and GPU 112, and may control the operation of the power-saving features including workload metering that performed by the GPU 112.

In operation, CPU 102 is the master processor of computer system 100, controlling and coordinating operations of other system components. In particular, CPU 102 issues commands that control the operation of the GPU 112. In some embodiments, the CPU 102 executes one or more application programs(s) 132 and writes a stream of commands for the GPU 112 to one or more push buffer(s) 131 that may be located in system memory 104, a local memory, or another storage location accessible to both CPU 102 and GPU 112. The CPU 102 outputs pointers to the push buffer(s) 131 that are queued within the GPU 112. The GPU 112 reads each pointer and then retrieves the command stream from the corresponding push buffer 131 and then executes commands asynchronously relative to the operation of CPU 102. The command stream defines the processing workload of the GPU 112.

Figure 2:
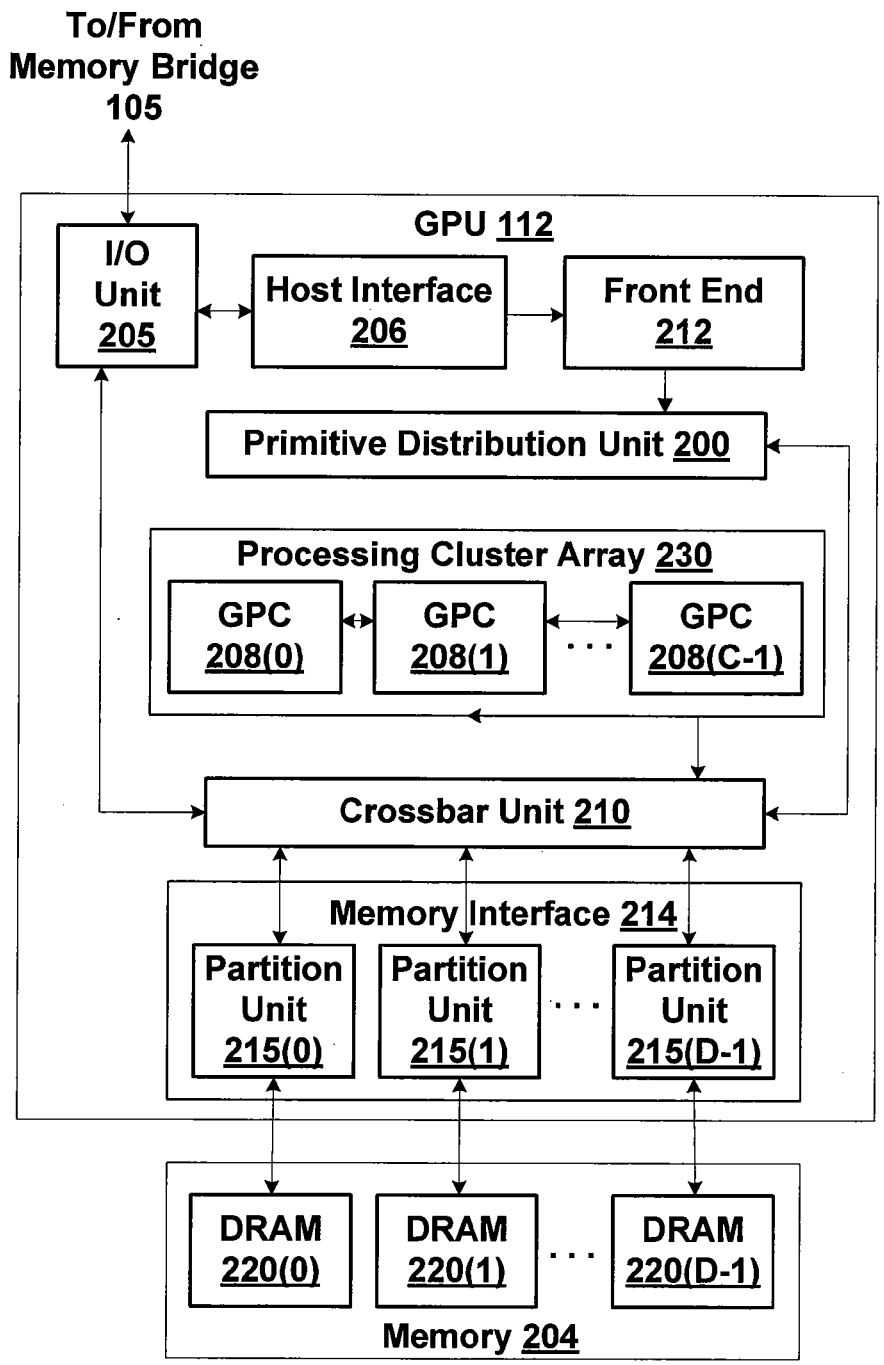
FIG. 2 is a block diagram of a GPU for the computer system of FIG. 1, according to one embodiment of the present invention.

FIG. 2 is a block diagram of the GPU 112 for the computer system 100 of FIG. 1, according to one embodiment of the present invention. As shown, GPU 112 is coupled to a local memory 204. The GPU 112 and memory 204 may be implemented using one or more integrated circuit devices, such as programmable processors, application specific integrated circuits (ASICs), or memory devices, or in any other technically feasible fashion. Each GPU 112 includes an I/O (input/output) unit 205, that communicates with the rest of computer system 100 via communication path 113, which connects to memory bridge 105 (or, in one alternative embodiment, directly to CPU 102). The connection of GPU 112 to the rest of computer system 100 may also be varied. In some embodiments, GPU 112 and memory 204 is implemented as an add-in card that can be inserted into an expansion slot of computer system 100. In other embodiments, a GPU 112 can be integrated on a single chip with a bus bridge, such as memory bridge 105 or I/O bridge 107. In still other embodiments, some or all elements of GPU 112 may be integrated on a single chip with CPU 102.

In one embodiment, communication path 113 is a PCI-EXPRESS link, in which dedicated lanes are allocated to GPU 112, as is known in the art. Other communication paths may also be used. An I/O unit 205 generates packets (or other signals) for transmission on communication path 113 and also receives all incoming packets (or other signals) from communication path 113, directing the incoming packets to appropriate components of GPU 112. For example, commands related to processing tasks may be directed to a host interface 206, while commands related to memory operations (e.g., reading from or writing to parallel processing memory 204) may be directed to a memory crossbar unit 210. Host interface 206 receives pointers to the push buffers 131, reads each push buffer 131, and outputs the work specified by the push buffer 131 to a front end 212. The processing workload for the GPU 112 is represented by the push buffers 131 and workload metering may be used to control the flow of the push buffers 131 into the host interface 206.

Each GPU 112 advantageously implements a highly parallel processing architecture. As shown in detail, GPU 112 includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. Herein, multiple instances of like objects are denoted with reference numbers identifying the object and parenthetical numbers identifying the instance where needed. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the push buffers 131 is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of local memory 204.

Any one of GPCs 208 may process data to be written to any of the DRAMs 220 within the local memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. GPU 112 may transfer data from system memory 104 and/or local memorys 204 into internal (on-chip) memory, process the data, and write result data back to system memory 104 and/or local memory 204, where such data can be accessed by other system components, including CPU 102 or another GPU 112.

A GPU 112 may be provided with any amount of local memory 204, including no local memory, and may use local memory and system memory 104 in any combination. For instance, a GPU 112 can be a graphics processor in a unified memory architecture (UMA) embodiment. In such embodiments, little or no dedicated graphics (local) memory would be provided, and GPU 112 would use system memory exclusively or almost exclusively. In UMA embodiments, a GPU 112 may be integrated into a bridge chip or processor chip or provided as a discrete chip with a high-speed link (e.g., PCI-EXPRESS) connecting the GPU 112 to system memory via a bridge chip or other communication means.

As noted above, any number of GPUs 112 can be included in a computer system 100. For instance, multiple GPUs 112 can be provided on a single add-in card, or multiple add-in cards can be connected to communication path 113, or one or more of GPUs 112 can be integrated into a bridge chip. GPUs 112 in a multi-GPU system may be identical to or different from one another. For instance, different GPUs 112 might have different numbers of processing cores, different amounts of local parallel processing memory, and so on. Where multiple GPUs 112 are present, those GPUs may be operated in parallel to process data at a higher throughput than is possible with a single GPU 112. Systems incorporating one or more GPUs 112 may be implemented in a variety of configurations and form factors, including desktop, laptop, or handheld personal computers, servers, workstations, game consoles, embedded systems, and the like.

Figure 3A:
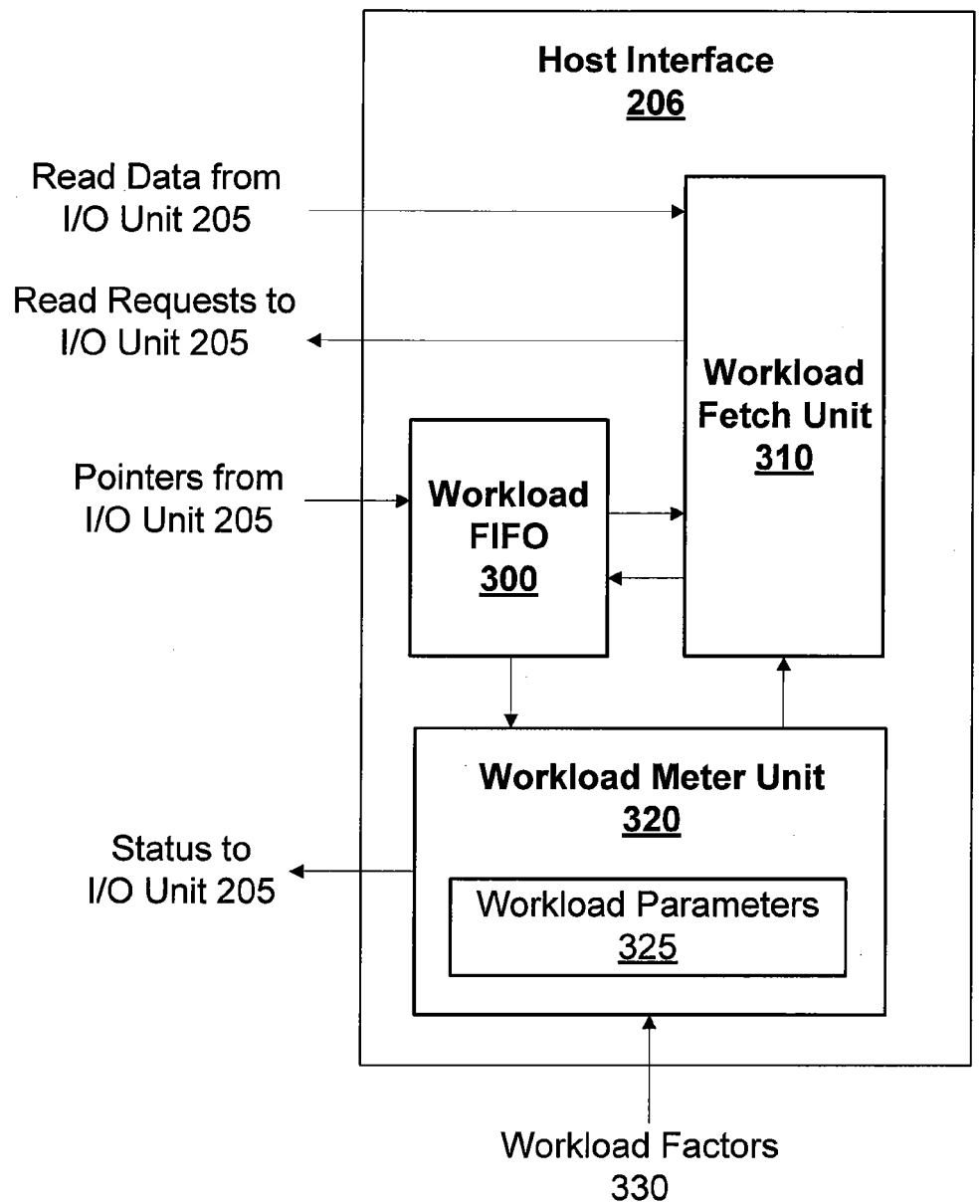
FIG. 3A is a block diagram of a host interface of FIG. 2, according to one embodiment of the present invention.

FIG. 3A is a block diagram of a host interface 206 of FIG. 2, according to one embodiment of the present invention. The host interface 206 includes a workload (first-in first-out buffer) FIFO 300, a workload fetch unit 310, and a workload meter unit 320. The workload FIFO 300 receives pointers from the I/O unit 205 and stores the pointers. The workload fetch unit 310 pops pointers from the workload FIFO 300, under the control of the workload meter unit 320, and fetches corresponding push buffers 131 from the system memory 104 via I/O unit 205. The commands read from the push buffer 131 are then output to another unit (not shown) in the host interface 206 or output by the host interface to the front end 212.

The workload meter unit 320 receives workload factors 330 from the other processing engines within the GPU 112 that indicates idleness of the processing engines or a measurement of the processing bursts over time for the workload that is received by the host interface 206. The workload factors 330 may include thermal measurement data from a temperature monitor (not shown) within the GPU 112. Additionally, the workload meter unit 320 receives the status of the workload FIFO 300, such as the number of entries that are full and/or empty in the workload FIFO 300. Workload parameters 325 are stored in the workload meter unit 320 and may be loaded by the device driver 103 and/or a resource manager for the computer system 100. The workload parameters 325 includes a freeze time and run time that enable and disable popping of pointers from the workload FIFO 300 by the workload fetch unit 310. The freeze time specifies an amount of time during which pointers are not popped by the workload fetch unit 310 and the run time specifies an amount of time during which pointers are popped by the workload fetch unit 310. When the freeze time expires, the run time begins and when the run time expires, the Freeze time begins, and so on. The freeze time and run time may be changed based on a performance level or power-saving level specified by a user and provided to the workload meter unit 320 by the device driver 103.

The workload metering feature may be enabled and disabled by the resource manager, device driver 103, or automatically by the workload meter unit 320. When implemented in software, the resource manager maintains the workload parameters and monitors the workload factors 330 to perform the functions of the workload meter unit 320.

Persons skilled in the art will understand that the architecture described in FIGS. 1, 2, and 3A in no way limits the scope of the present invention and that the techniques taught herein may be implemented on any properly configured processing unit, including, without limitation, one or more CPUs, one or more multi-core CPUs, one or more GPUs 112, one or more GPCs 208, one or more graphics or special purpose processing units, or the like, without departing the scope of the present invention.

Figure 3B:
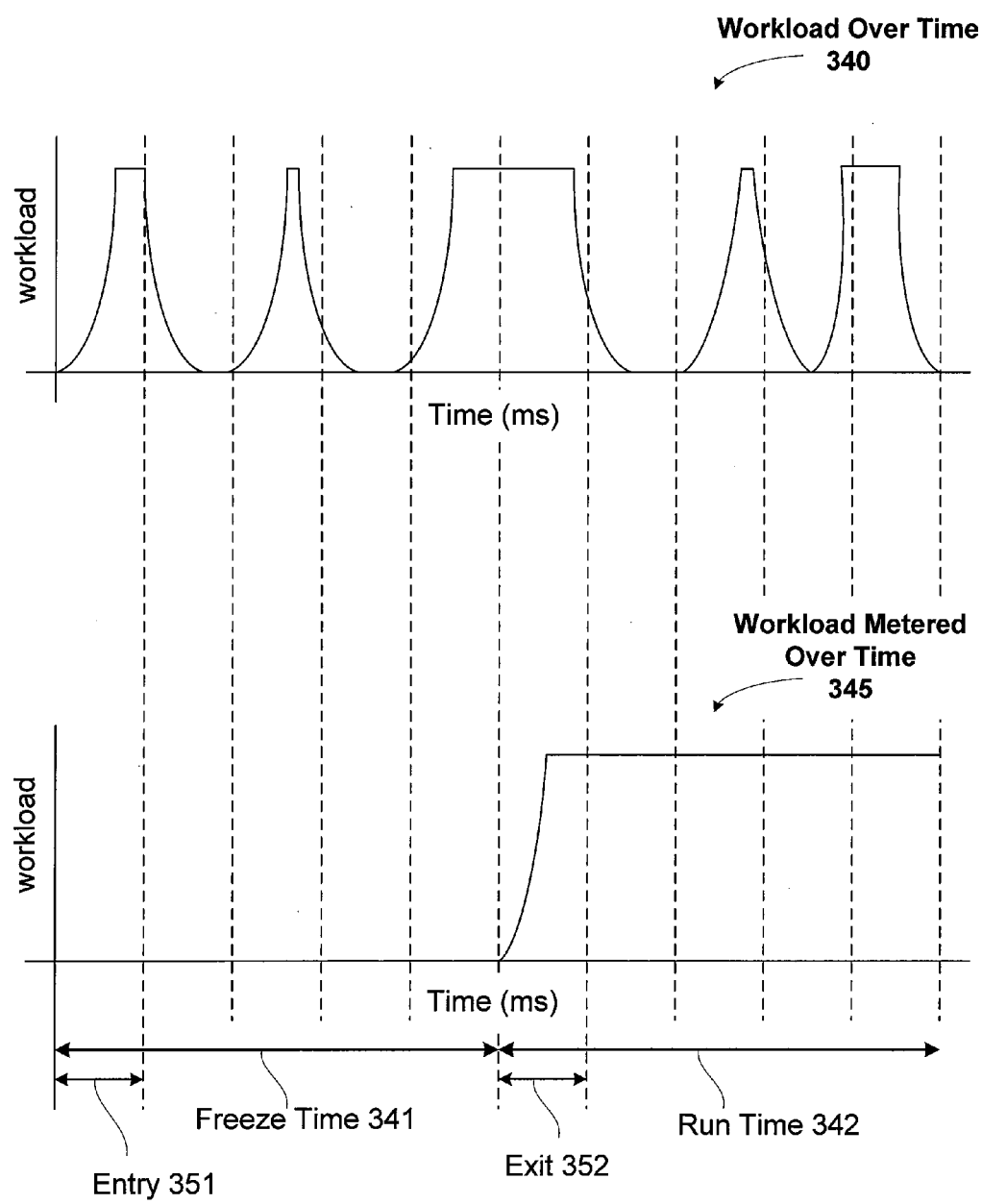
FIG. 3B is a diagram of a processing workload and a metered processing workload, according to one embodiment of the present invention.

FIG. 3B is a diagram of a processing workload and a metered processing workload metered over time 345, according to one embodiment of the present invention. The workload over time 340 has small bursts of processing work broken up by periods of idleness and one larger burst of processing work that is output by the host interface 206 for processing by the processing cluster array 230. Conventional power saving features, such as clock gating, typically incur an entry and exit latency each time the power saving feature is engaged. When the periods of idleness are not greater than the combination of the entry and exit latency the power saving feature should not be engaged since a power saving will not be realized. By metering the workload that is output by the host interface 206, the periods of idleness may be coalesced into a larger period of idleness as shown in the workload metered over time 345 and the bursts of processing may be coalesced into larger bursts of processing. This larger period of idleness exceeds the combination of the entry and exit latency so that a conventional power saving feature may be engaged to reduce the power consumption of the device.

More specifically, during the freeze time 341 a power saving feature is immediately enabled and at the entry latency is shown as entry 351. During the Freeze time 341 no pointers are read from the workload FIFO 300 and no read data (commands) are read by the workload fetch unit 310. During the freeze time 341 the workload FIFO 300 does accept and store pointers from the I/O unit 205 so that the pointers are not dropped. The workload meter unit 320 does provide status to the I/O unit 205 indicating the fullness of the workload FIFO 300 so that the CPU 102 may stop outputting pointers to the GPU 112. The freeze time 341 and run time 342 may be provided to the CPU 102 by the resource manager or device driver 103 so that the CPU 102 may also meter the output of pointers to the GPU 112.

During the run time 342 pointers are read from the workload FIFO 300 and read data is read by the workload fetch unit 310. Any power saving feature that was enabled during the freeze time 341 is automatically disabled when the processing workload resumes and the exit latency for the power saving feature is shown as exit 352. When the run time 342 is initiated, the workload increases and a maximum workload may be processed until the freeze time is initiated 371. When the workload metering is used to increase the duration of the idle periods by coalescing several idle periods, the power savings features may reduce the power consumed by the GPU 112. Without the workload metering, the power saving features may not operate and the power consumed by the GPU 112 may not be reduced.

Figure 3C:
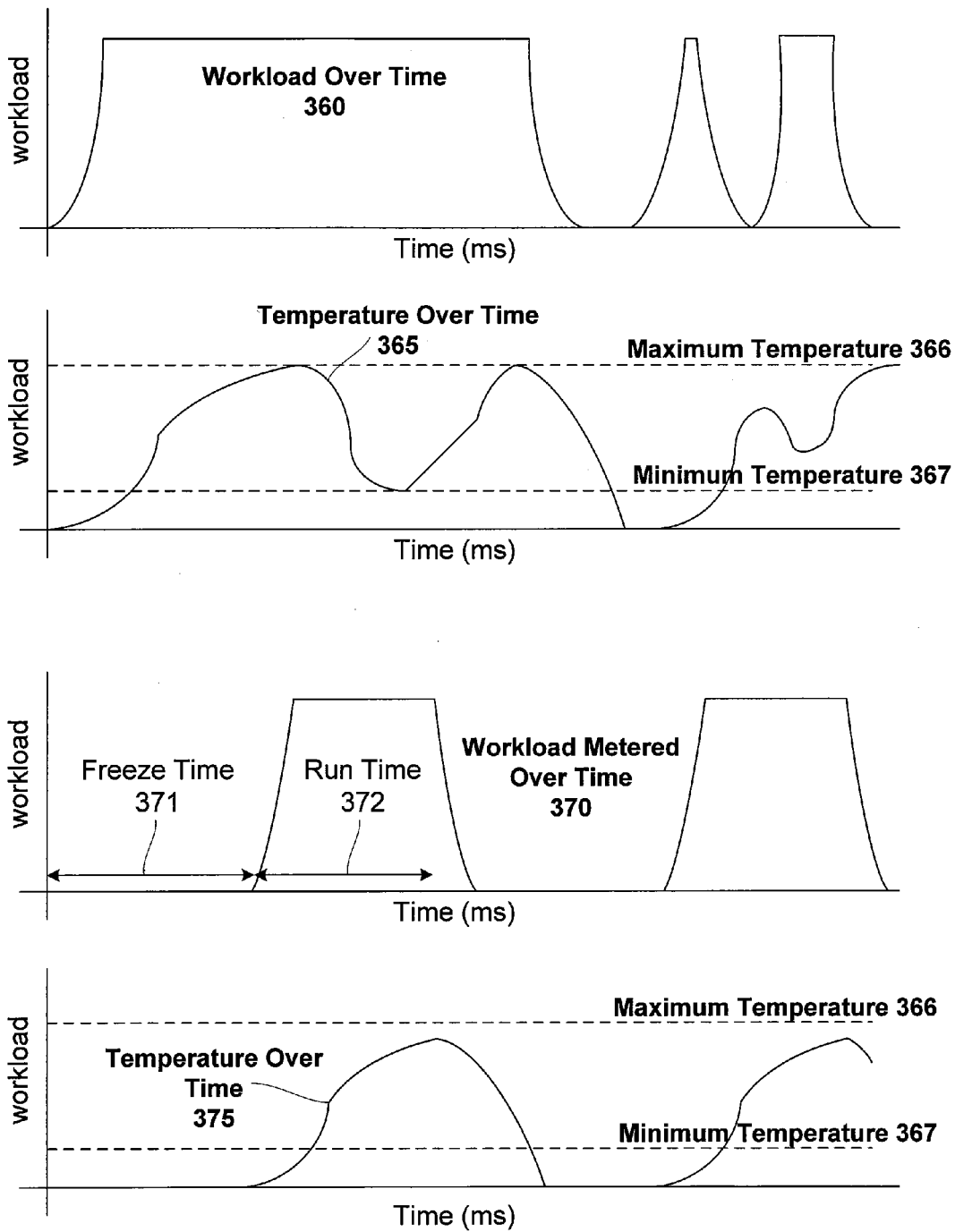
FIG. 3C is a diagram of a processing workload and associated temperature over time and a metered processing workload and associated temperature over time, according to one embodiment of the present invention.

FIG. 3C is a diagram of a processing workload over time 360 and associated temperature over time 365 and a processing workload metered over time 370 and associated temperature over time 375, according to one embodiment of the present invention. The workload over time 360 has a large burst of processing work and some smaller bursts of processing work that are broken up by periods of idleness. This processing workload may be metered by the host interface 206 based on the freeze time 371 and the run time 372 to produce the processing workload metered over time 370 for processing.

As shown by the temperature over time 365 a temperature control feature is enabled when the temperature reaches a maximum temperature 366. The temperature control feature may be configured to slow the clock rate of the GPU 112 or to slow the clock rate for one or more processing engines within the GPU 112 in order to reduce the power consumption and temperature. The maximum workload output by the host interface 206 is maintained while the clock rate is reduced and the processing throughput of the GPU 112 is decreased due to the reduced clock rate. When the temperature reaches a minimum temperature 367, the temperature control feature is disabled and the temperature rises as the clock rate is increased. The temperature control feature may not provide a fine grained control and is not able to adjust the clock rate to one that keeps the GPU 112 operating at a temperature just below the maximum temperature 366. In one embodiment the clock rate is reduced to one-quarter of the clock rate. The performance reduction may be noticed by a user as the image is displayed at a lower frequency and appears to flicker.

As shown by the temperature over time 375, the workload metering may be used to maintain a temperature that is below the maximum temperature 366. In contrast with the workload metering shown in FIG. 3B, a large burst of processing shown in workload over time 360 is broken into smaller bursts of processing to produce workload metered over time 370. The freeze time 371 and run time 372 are set to allow for a run time 372 sufficient to process a portion of the workload while also not allowing the temperature to reach the maximum temperature 366. The run time 372 may be increased to improve processing throughput as long as the temperature is below the maximum temperature 366, thereby avoiding a slowing of the clock rate due to the temperature control feature. In this manner, the workload metering may be used to control the thermal characteristics of the GPU 112. Similarly, workload metering may be used with other devices, such as CPU 102 to control the thermal characteristics.

Figure 4A:
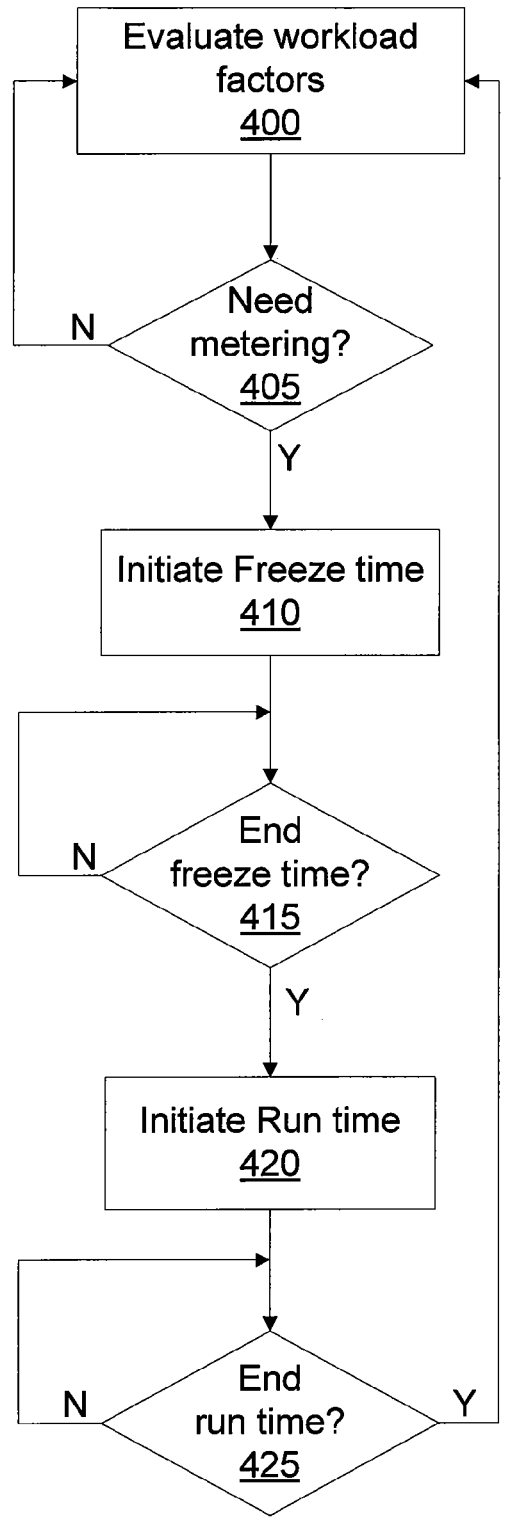
FIG. 4A is a flow diagram of method steps for metering a processing workload, according to one embodiment of the present invention.

FIG. 4A is a flow diagram of method steps for metering a processing workload, according to one embodiment of the present invention. At step 400 the workload factors 330 received by the workload meter unit 320 is evaluated. The workload factors 330 may include an indication of idleness, such status provided by one or more processing engines within the GPU 112 or a display screen being dimmed to disabled. At step 405 the workload meter unit 320 determines if the workload should be metered. In addition to the workload factors 330, the workload meter unit 320 may also consider any workload metering parameters that are specified by the user. For example, the user may specify a power savings of 20% or that the computer system 100 operate for a particular amount of time between battery charges.

If, at step 405 the workload meter unit 320 determines that metering is not needed, then the workload meter unit 320 repeats step 400. Otherwise, at step 410 the workload meter unit 320 initiates the freeze time specified by the workload parameters 325. When the freeze time is initiated, the workload meter unit 320 may also explicitly enable any power savings features. A timer is loaded with the freeze time and decremented to determine when the freeze time is complete. Alternatively, a timer is incremented and the freeze time is completed when the timer equals the freeze time. In one embodiment, the workload meter unit 320 is included in the host interface 206 to track the freeze time and control whether or not any pointers are popped and whether or not any read data is requested by the workload fetch unit 310. In other embodiments, a resource manager may be configured to initiate and track the freeze time and control whether or not any pointers are popped and whether or not any read data is requested by the workload fetch unit 310.

At step 415 the workload fetch unit 310 determines if the freeze time is completed, and, if not, step 415 is repeated. Otherwise, at step 420 the workload fetch unit 310 initiates the run time specified by the workload parameters 325. A timer is loaded with the run time and decremented to determine when the run time is complete. Alternatively, a timer is incremented and the run time is completed when the timer equals the run time. At step 425 the workload fetch unit 310 determines if the run time is completed, and, if not, step 425 is repeated. Otherwise, the workload fetch unit 310 returns to step 400. Note that the freeze and run times may be changed by the workload meter unit 320 based on the workload factors 330 or by the device driver 103 or resource manager.

The device driver 103 or resource manager may be configured to provide the freeze and run times to the CPU 102 and to inform the CPU 102 when the workload metering is performed by the GPU 112 so that the CPU 102 may meter the workload that is output to the GPU 112. In some cases, the CPU 102 may enter a low power mode during the freeze time to further reduce the power consumption of the computer system 100. Alternatively, the CPU 102 may monitor how far "ahead" the CPU 102 is compared with the GPU 112 and meter the writing of push buffers 131 so that the CPU 102 does not get to far "ahead" of the GPU 112.

Figure 4B:
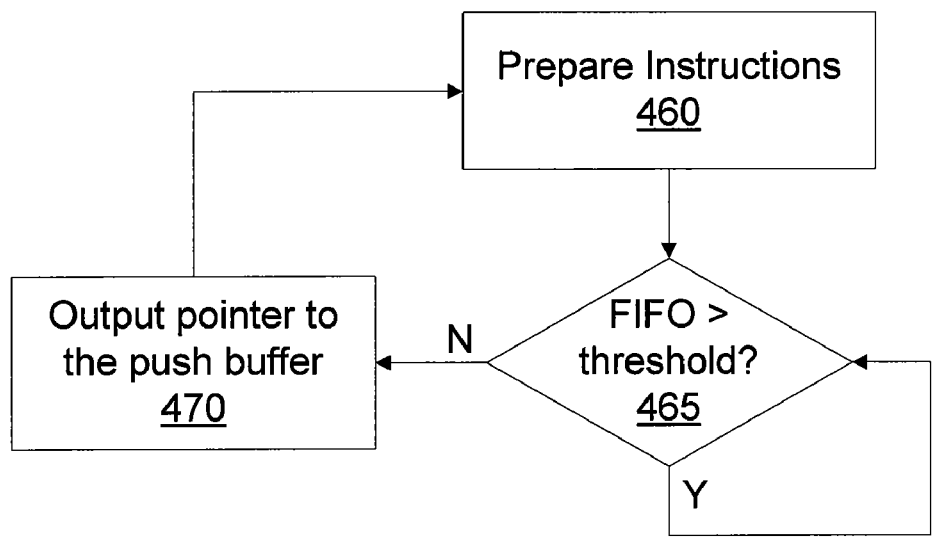
FIG. 4B is a flow diagram of method steps for metering a processing workload at the CPU, according to one embodiment of the present invention.

FIG. 4B is a flow diagram of method steps for metering a processing workload at the CPU 102, according to one embodiment of the present invention. At step 460 the CPU 102 prepares instructions for a push buffer 131. At step 465 the CPU 102 determines if the number of entries stored in the workload FIFO 300 exceeds a threshold value, and, if so, the CPU 102 continues to track the fullness of the workload FIFO 300 until the number of entries stored in the workload FIFO 300 equals or falls below the threshold value. When, at step 465, the number of entries stored in the workload FIFO 300 does not exceed the threshold value, at step 470 a pointer to the push buffer 131 storing the instructions is output to the GPU 112 and pushed into the workload FIFO 300.

Although the techniques for metering the command stream have been described in the context of a GPU 112, the metering techniques may also be used by other types of processors to coalesce multiple smaller workloads into one or more larger workloads with longer periods of idleness between the larger workloads. The processor may be idled during the longer periods of idleness and power consumption may be reduced by initiating power saving features of the processor. Conversely, a large workload may be metered to break the large workload into smaller bursts to ensure that the processor operates below a maximum temperature limit. The freeze time and run time that control the metering may be changed dynamically based on workload factors and/or workload parameters.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for metering a processing workload, the method comprising:
   receiving a processing workload at a first processor, wherein a second processor writes pointers to push buffers storing a command stream defining the processing workload into a workload buffer;
   determining that the processing workload will be metered to produce a metered processing workload;
   initiating a freeze time during which the pointers are not read from the workload buffer and the command stream defining the metered processing workload is not fetched and is not executed by the first processor;
   initiating a run time during which the pointers are read from the workload buffer and the command stream defining the metered processing workload is fetched and executed by the first processor; and
   providing the freeze time and the run time to the second processor.

2. The method of claim 1, wherein the step of determining comprises receiving a measurement of processing bursts over time for the processing workload.

3. The method of claim 1, wherein the freeze time and the run time coalesce bursts of processing in the processing workload into larger bursts of processing to produce the metered processing workload.

4. The method of claim 1, further comprising the step of engaging a power saving feature of the first processor simultaneously with the initiating of the freeze time when a period of idleness during the freeze time exceeds a combination of an entry and exit latency associated with the power saving feature.

5. The method of claim 1, further comprising, during the freeze time, halting output of the processing workload that is output by the second processor to the first processor based on a fullness of the workload buffer.

6. The method of claim 1, wherein the second processor is configured to meter writing of the pointers to the workload buffer based on the freeze time and the run time.

7. A computer-readable storage medium storing instructions that, when executed by a first processor, cause the first processor to meter a processing workload, by performing the steps of:
   receiving a processing workload at a processor, wherein a second processor writes pointers to push buffers storing a command stream defining the processing workload into a workload buffer;
   determining that the processing workload will be metered to produce a metered processing workload receiving a processing workload at the first processor;
   initiating a freeze time during which the pointers are not read from the workload buffer and the command stream defining the metered processing workload is not fetched and is not output for execution by the first processor;
   initiating a run time during which the pointers are read from the workload buffer and the command stream defining the metered processing workload is fetched and executed by the first processor; and providing the freeze time and the run time to the second processor.

8. The computer-readable storage medium of claim 7, wherein the freeze time and the run time coalesce bursts of processing in the processing workload into larger bursts of processing to produce the metered processing workload.

9. The computer-readable storage medium of claim 7, wherein the second processor is configured to meter writing of the pointers to the workload buffer based on the freeze time and the run time.

10. The computer-readable storage medium of claim 7, further comprising, during the freeze time, halting output of the processing workload that is output by the second processor to the first processor based on a fullness of the workload buffer.

11. The computer-readable storage medium of claim 7, further comprising engaging a power saving feature of the first processor simultaneously with the initiating of the freeze time when a period of idleness during the freeze time exceeds a combination of an entry and exit latency associated with the power saving feature.

12. A system for metering a processing workload, the system comprising:

a first processor configured to:

receive a processing workload, wherein a second processor writes pointers to push buffers storing a command stream defining the processing workload into a workload buffer;

determine that the processing workload will be metered to produce a metered processing workload;

initiate a freeze time during which the pointers are not read from the workload buffer and the command stream defining the metered processing workload is not fetched and is not executed by the first processor;

initiate a run time during which the pointers are read from the workload buffer and the command stream defining the metered processing workload is fetched and executed by the first processor; and provide the freeze time and the run time to the second processor.

13. The system of claim 12, wherein the processor is further configured to receive a measurement of processing bursts over time for the processing workload and determine that the processing workload will be metered based on the measurement of processing bursts over time.

14. The system of claim 12, wherein the freeze time and the run time coalesce bursts of processing in the processing workload into larger bursts of processing to produce the metered processing workload.

15. The system of claim 12, wherein the processor is further configured to engage a power saving feature of the first processor simultaneously with the initiating of the freeze time when a period of idleness during the freeze time exceeds a combination of an entry and an exit latency associated with the power saving feature.

16. The system of claim 12, wherein the second processor is configured to meter writing of the pointers to the workload buffer based on the freeze time and the run time.

17. The system of claim 12, wherein the second processor is further configured to, during the freeze time, halt output of the processing workload to the first processor based on a fullness of the workload buffer.

* * * * *